(12) United States Patent
Li et al.

(10) Patent No.: US 10,359,563 B2
(45) Date of Patent: Jul. 23, 2019

(54) FEW-MODE OPTICAL FIBER (71) Applicant: CORNING INCORPORATED, Corning, NY (US)

(72) Inventors: Ming-Jun Li, Horseheads, NY (US); Gaozhu Peng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/070,283

(22) Filed: Mar. 15, 2016

(65) Prior Publication Data

US 2016/0274300 A1  Sep. 22, 2016

Related U.S. Application Data (60) Provisional application No. 62/135,945, filed on Mar. 20, 2015.

(51) Int. Cl.
 *G02B 6/028* (2006.01)
 *G02B 6/024* (2006.01)
 *G02B 6/036* (2006.01)

(52) U.S. Cl.
 CPC ........... *G02B 6/0288* (2013.01); *G02B 6/024* (2013.01); *G02B 6/0365* (2013.01)

(58) Field of Classification Search
 CPC .. G02B 6/0288; G02B 6/02342; G02B 6/024; G02B 6/0365; G02B 6/02004; G02B 6/02023; G02B 6/02047
 See application file for complete search history.

(56) References Cited

U.S. PATENT DOCUMENTS

| | | | |
|---|---|---|---|
| 6,326,416 B1 | 12/2001 | Chien et al. | |
| 6,422,043 B1 | 7/2002 | DiGiovanni et al. | |
| 6,531,522 B1 | 3/2003 | Winningham | |
| 6,539,152 B1 | 3/2003 | Fewkes et al. | |
| 6,563,996 B1 | 5/2003 | Winningham | |
| 6,869,981 B2 | 3/2005 | Fewkes et al. | |
| 6,948,340 B2 | 9/2005 | Okagawa et al. | |
| 7,010,206 B1 | 3/2006 | Baker et al. | |
| 7,043,128 B2 | 5/2006 | DiGiovanni et al. | |
| 7,068,900 B2 | 6/2006 | Croteau et al. | |
| 7,221,842 B2 | 5/2007 | Baker et al. | |
| 7,423,105 B2 | 9/2008 | Winningham | |
| 7,502,539 B2 * | 3/2009 | Gray ................ | C03B 37/01413 385/123 |
| 7,724,422 B2 * | 5/2010 | Abramczyk ........... | G02B 6/105 359/341.1 |
| 8,731,358 B2 | 5/2014 | Pare et al. | |
| 8,837,892 B2 | 9/2014 | Bennett et al. | |

(Continued)

OTHER PUBLICATIONS

N. Riesen, J.D. Love, and J. Arkwright, "Few-Mode Elliptical Core Fiber Data Transmission", IEEE Photonics Technology Letters, vol. 24. No. 5, Mar. 1. 2012.

(Continued)

*Primary Examiner* — John Bedtelyon (57) ABSTRACT

A few-mode optical fiber is provided. The few-mode optical fiber includes an elliptical core capable of supporting the propagation and transmission of an optical signal with X number of LP modes at a wavelength of 1550 nm, wherein X is an integer greater than 1 and less than 20, and a cladding surrounding the core. The core has an ovality of greater than about 5.0%.

13 Claims, 3 Drawing Sheets

(56) References Cited

U.S. PATENT DOCUMENTS

2002/0172486 A1 11/2002 Fermann
2013/0230290 A1 9/2013 Evans et al.

OTHER PUBLICATIONS

Lenahan, T., "Calculation of Modes in an Optical Fiber Using a Finite Element Method and Eispack," Bell Syst. Tech. J., vol. 62, No. 9, pp. 2663-2694, Nov. 1983.

* cited by examiner

FEW-MODE OPTICAL FIBER

This application claims the benefit of priority under 35 U.S.C. § 119 of U.S. Application Ser. No. 62/135,945 filed on Mar. 20, 2015, the content of which is incorporated herein by reference in its entirety.

FIELD

The present disclosure relates to optical fiber, and more particularly to few-mode optical fiber.

BACKGROUND

Optical fiber is a common transmission medium for telecommunications. It is especially advantageous for long distance communications because light propagates through the fiber with little attenuation as compared to electrical cables and because higher data rates are possible.

In most long distance communication applications, single mode optical fiber is used. However, the use of multimode optical fiber or few mode optical fiber can provide higher information capacity than using single mode optical fiber through a mode division multiplexing technique. Few mode fiber, by definition, is designed to support multiple guided modes at a given wavelength. Each mode can be used to transmit independent optical channels therefore increasing the total capacity by a factor of N, where N is the number of modes supported by the few mode fiber.

Although the ability to support multiple guided modes could be used to transmit more data, few mode fiber can suffer from distortion issues which become particularly problematic over longer distances. For example, fiber imperfections, such as index inhomogeneity and bends, may cause coupling between modes. As a result of mode coupling, a light pulse launched into a single mode couples to other modes, which leads to a superposition of several pulses at the fiber output and causes interference and a reduction of fiber bandwidth.

Coherent detection and computationally intensive multiple input multiple output (MIMO) digital signal processing (DSP) have been utilized to mitigate these distortion issues. However, utilization of such techniques increases the complexity of the components of the data transmission system, which in turn leads to reductions in energy efficiency and increases the costs associated with the system.

SUMMARY

According to an embodiment of the present disclosure, a few-mode optical fiber is provided. The few-mode optical fiber includes an elliptical core capable of supporting the propagation and transmission of an optical signal with X number of LP modes at a wavelength of 1550 nm, wherein X is an integer greater than 1 and less than 20, and a cladding surrounding the core. The core has an ovality of greater than about 5.0%.

According to another embodiment of the present disclosure, a few-mode optical fiber is provided. The few-mode optical fiber includes a core capable of supporting the propagation and transmission of an optical signal with X number of LP modes, wherein X is an integer greater than 1 and less than 20. The few-mode optical fiber also includes a cladding surrounding the core and at least one stress member situated in the cladding.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The term "refractive index profile," as used herein, is the relationship between the refractive index or the relative refractive index and the radius of the fiber.

The term "relative refractive index," as used herein, is defined as:

$$\Delta(r) = [n(r)^2 - n_{REF}^2]/2n_{REF}^2,$$

where n(r) is the refractive index at radius r, unless otherwise specified. The relative refractive index is defined at 1550 nm unless otherwise specified. The reference index $n_{REF}$ is pure silica glass, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

As used herein, the "effective area" $A_{eff}$ of an optical fiber is the area of the optical fiber in which light is propagated and is defined as:

$$A_{eff} = 2\pi \frac{\left(\int_0^\infty E^2 r\, dr\right)^2}{\int_0^\infty E^4 r\, dr},$$

where E is the electric field associated with light propagated in the fiber and r is the radius of the fiber. The effective area is determined at a wavelength of 1550 nm, unless otherwise specified.

As used herein, the term "few mode fiber" refers to a fiber supporting the propagation of more modes than a single mode fiber but fewer modes than a normal multimode fiber (i.e., not greater than 20 LP modes). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983).

The term "α-profile" or "alpha profile," as used herein, refers to a relative refractive index profile, expressed in terms of Δ which is in units of "%", where r is the radius and which follows the equation, $$\Delta = \Delta_0 \left[ 1 - \left( \frac{r}{R_1} \right)^\alpha \right],$$

where $\Delta_0$ is the maximum relative refractive index, $R_1$ is the radius of the core, r is in the range $r_i \leq r \leq r_f$, Δ is as defined above, $r_i$ is the initial point of the α-profile, $r_f$ is the final point of the α-profile, and α is a real number exponent. For a step index profile, the alpha value is greater than or equal to 10. As defined herein, for a graded index profile, the alpha value is less than 5. For a parabolic index profile, the alpha value is $1.8 < \alpha < 2.3$.

In few mode fibers with circular cores, propagation constants along fiber core axes are approximately equal for all spatial modes in each mode group due to fiber core symmetry. Light traveling in an optical fiber or other dielectric waveguide forms hybrid-type modes, which are usually referred to as LP (linear polarization) modes. The $LP_{0P}$ modes have two polarization degrees of freedom and are two-fold degenerate, the $LP_{1P}$ modes are four-fold degenerate with two spatial and two polarization degrees of freedom, and the $LP_{MP}$ modes with m>1 are also four-fold degenerate. We do not count these degeneracies when we designate the number of LP modes propagating in the fiber. For example, an optical fiber in which only the $LP_{01}$ mode propagates is a single mode fiber, even though the $LP_{01}$ mode has two possible polarizations. A few mode optical fiber in which the $LP_{01}$ and $LP_{11}$ modes propagate supports three spatial modes since the $LP_{11}$ mode is two-fold degenerate, and each mode also has two possible polarizations, giving a total of 6 modes. Thus, when a fiber is said to have two LP modes, it is meant that the fiber supports the propagation of all of the subgroups of the $LP_{01}$ and $LP_{11}$ modes.

However, the two sets of degrees of freedom (also called the subgroups of the modes herein), that form the $LP_{MP}$ with m>0 modes are not completely degenerate and have a small difference in propagation constant or in effective index. For example, the two spatial and two polarization degrees of freedom that form an $LP_{11}$ mode may have an effective index difference ($\Delta n_{eff}$) of about $2.8 \times 10^{-6}$. As a result of the small effective index difference, coupling of the degrees of freedom within the mode is common.

Figure 1:
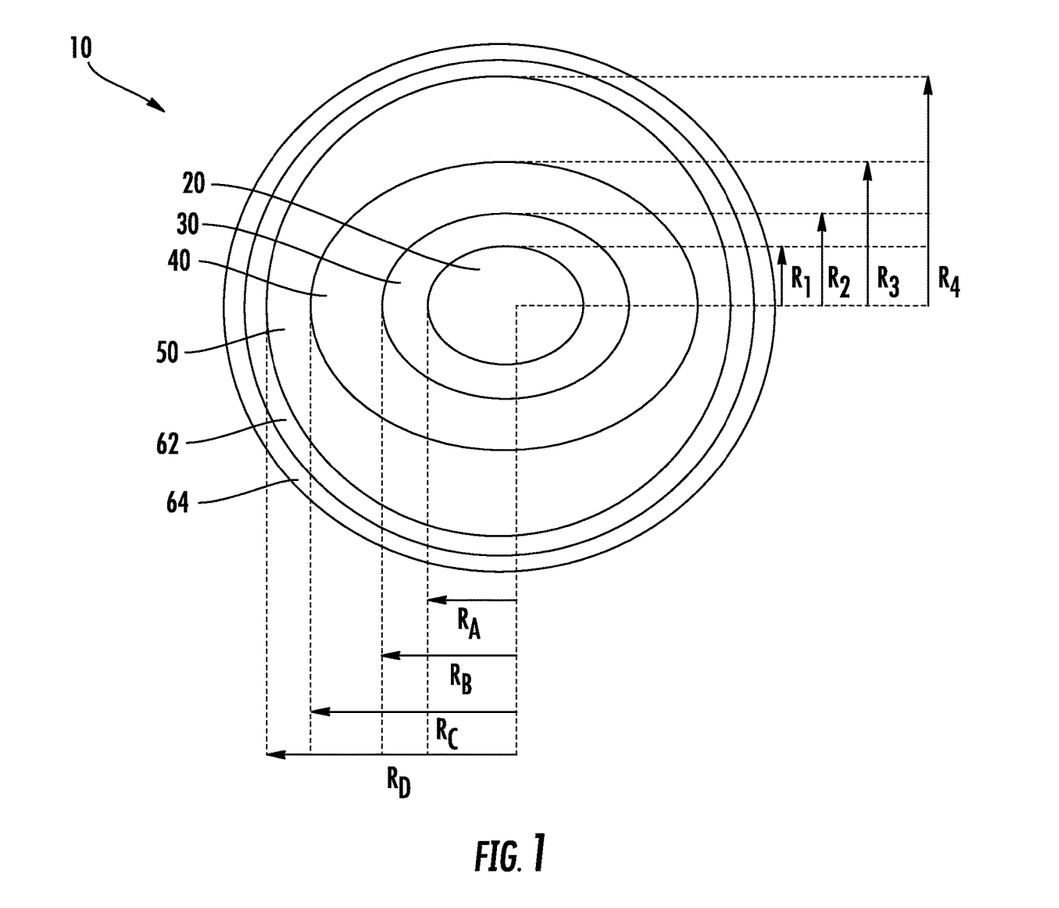
FIG. 1 illustrates a cross section of an optical fiber in accordance with embodiments of the present disclosure.

FIG. 1 illustrates a cross-section of a few mode optical fiber 10 in accordance with embodiments of the present disclosure. As shown, the optical fiber 10 includes an elliptical, silica based core 20 of radius $R_1$ in a first dimension and radius $R_A$ in a dimension perpendicular to the first dimension, where one of $R_1$ and $R_A$ is greater than the other of $R_1$ and $R_A$. The core 20 may include pure silica glass ($SiO_2$) or silica glass with one or more dopants that increase the index of refraction of the glass core relative to pure, undoped silica glass. Dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof. The core 20 may have a step index profile or a graded index profile and a maximum relative refractive index of $\Delta_{1\ MAX}$. Where the core 20 has a graded index, the core 20 may have an alpha that reduces differential mode group delays among the modes. The alpha may be, for example, between about 1.8 and about 2.3. The relative refractive index difference of $\Delta_{1\ MAX}$ with respect to pure silica may be between about 0.3% and about 1.0%, for example, between about 0.4% and about 0.6%.

The core 20 radii $R_1$ and $R_A$ are between about 3.0 μm and about 50 μm. For example, the core 20 radii $R_1$ and $R_A$ may be between about 5.0 μm and about 20 μm. The average core radius $R_0$ may be between about 6.0 μm and about 40 μm. For example, the average core radius $R_0$ may be between about 8 μm and about 20 μm. As used herein, the average core radius $R_0$ is defined as:

$$R_0 = \frac{R_1 + R_A}{2}$$

The core 20 radii $R_1$ and $R_A$ are selected according to the core delta to support at least two modes at 1550 nm wavelength. An effective area $A_{eff}$ of the $LP_{01}$ may be between about 60 μm² and about 350 μm². For example, the $A_{eff}$ of the $LP_{01}$ may be between about 80 μm² and about 325 μm², or between about 150 μm² and about 325 μm², or between about 175 μm² and about 300 μm². According to embodiments of the present disclosure, the numerical aperture NA of the optical fiber 10 is between about 0.15 and about 0.30, for example between about 0.15 and about 0.25, or between about 0.18 and about 0.22, or even between about 0.15 and about 0.20.

The core 20 is a few mode core that supports the propagation and transmission of an optical signal with X number of LP modes at a wavelength of 1550 nm, wherein X is an integer greater than 1 and less than 20, for example X=19, X=16, X=12, X=10, X=9, X=6, X=4, X=3 or X=2. The number of modes may be 2 to 10. For example, the number of modes may be 2 to 5.

The optical fiber 10 also includes a cladding of radius $R_4$ in a first dimension and radius $R_D$ in a dimension perpendicular to the first dimension. In the embodiment shown in FIG. 1, $R_4=R_D$. The cladding includes at least two cladding layers and surrounds the core 20. The cladding has a low-index ring 40 of radius $R_3$ in a first dimension and radius $R_C$ in a dimension perpendicular to the first dimension, where one of $R_3$ and $R_C$ is greater than the other of $R_3$ and $R_C$. The low-index ring 40 has a minimum relative refractive index of $\Delta_{2\ MIN}$, where $\Delta_{2\ MIN} \leq 0$ relative to the outer cladding layer 50. The relative refractive index difference of $\Delta_{2\ MIN}$ with respect to the outer cladding layer 50 may be less than about −0.2%, for example less than about −0.25%, or even less than about −0.3%. $\Delta_{2\ MIN}$ may be, for example, between about or −0.2% and about −0.6%. The low-index ring 40 may be a down-doped section of the cladding. The low-index ring 40 shown in the exemplary optical fiber 10 of FIG. 1 is spaced from the core 20 by an optional first cladding layer 30 of radius $R_2$ in a first dimension and radius $R_B$ in a dimension perpendicular to the first dimension, where one of $R_2$ and $R_B$ is greater than the other of $R_2$ and $R_B$. The first cladding layer 30 has a refractive index delta $\Delta_3$. The cladding also includes an outer cladding layer 50 surrounding the low-index ring 40 and having a maximum relative refractive index $\Delta_{4\ MAX}$, where $\Delta_{1\ MAX} > \Delta_{4\ MAX} > \Delta_{2\ MIN}$. The optical fiber 10 may also include at least one coating surrounding and contacting the outer cladding layer 50.

As shown in FIG. 1, the optical fiber 10 has an elliptical core 20, where the elliptical shape of the core 20 is defined by ovality $\chi$, or the degree of deviation from circularity. As used herein, ovality $\chi$ is defined as:

$$\chi = \frac{R_A - R_1}{(R_A + R_1)/2}$$

According to embodiments of the present disclosure, the ovality $\chi$ of the core 20 is greater than about 0.02. For example, the ovality $\chi$ of the core 20 is greater than about 0.05, or even greater than about 0.08. The elliptical core 20 has increased birefringence as compared to a circular core. The increased birefringence of the core 20 contributes to the mode maintaining properties of the optical fiber 10 and decreases mode coupling. The birefringence of the core 20 is greater than about $5.0 \times 10^{-5}$ over the wavelength range from about 800 nm to about 1700 nm. For example, the birefringence of the core 120 may be greater than about $1.0 \times 10^{-4}$ over the wavelength range from about 800 nm to about 1700 nm.

Figure 2:
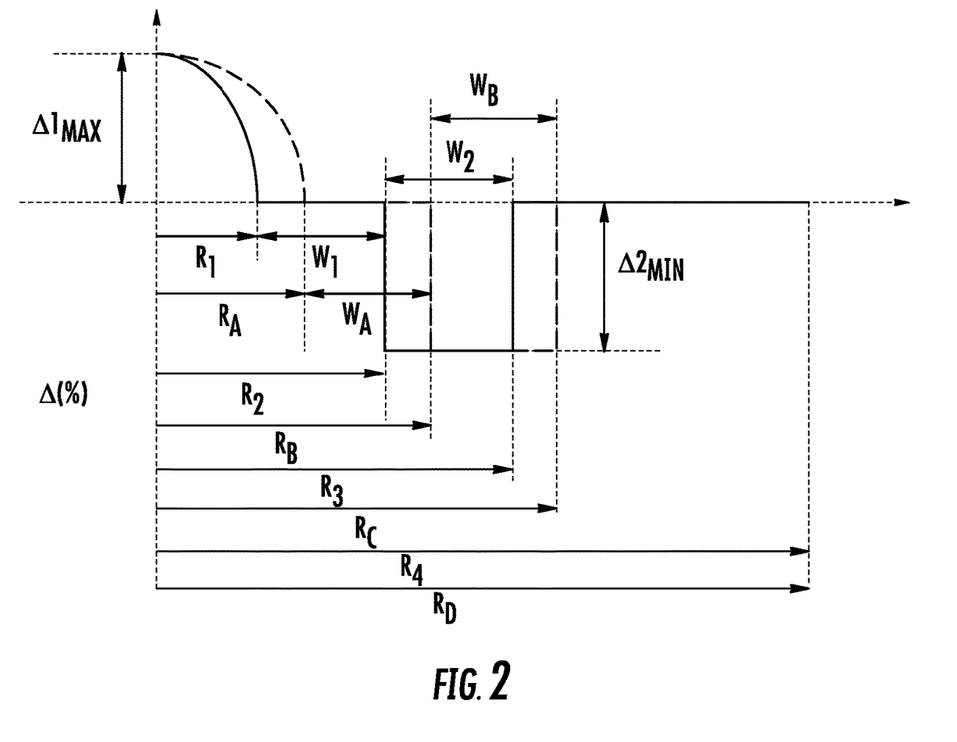
FIG. 2 illustrates the relative refractive index profile of the optical fiber of FIG. 1.

FIG. 2 illustrates the relative refractive index profile of the optical fiber 10 of FIG. 1. The solid line illustrates the relative refractive index profile of the fiber 10 in a first dimension, and the dashed line illustrates the relative refractive index profile of the fiber 10 in a dimension perpendicular to the first dimension. The fiber 10 has a step or a graded core 20 surrounded by a cladding adjacent to the core 20. The cladding includes a first cladding layer 30 surrounding the core 20, a low-index ring 40 surrounding the first cladding layer 30, and an outer cladding layer surrounding the low-index ring 40. The first cladding layer 30 has a width $W_1$ in a first dimension, and a width $W_A$ in a dimension perpendicular to the first dimension, where one of $W_1$ and $W_A$ is greater than or equal to the other of $W_1$ and $W_A$. The average width of the first cladding layer 30 is between about 0 µm and about 5.0 µm. For example, the average width of the first cladding layer 30 may be between about 1.0 µm and about 3.0 µm. The low-index ring 40 has a width $W_2$ in a first dimension, and a width $W_B$ in a dimension perpendicular to the first dimension, where one of $W_2$ and $W_B$ is greater than or equal to the other of $W_2$ and $W_B$. The average width of the low-index ring 40 is between about 2 µm and about 10.0 µm. For example, the average width of the first cladding layer may be between about 3.0 µm and about 5.0 µm.

The refractive index fiber profile shown in FIG. 2 may be a result of the cladding being down-doped relative to the core 20. The core 20 may be essentially pure silica. Alternatively, the core 20 may include germania-doped silica, wherein germania is provided in a sufficient amount such that the core has a delta %, $\Delta_1$, between about 0.2% and about 2.5%. For example the core 20 may have a delta of between about 0.3% and about 1.0%, or even between about 0.3% and about 0.5%. The core 20 may also include some alkali, for example less than about 0.05 wt. % potassium or less than about 0.05 wt. % chlorine to control the viscosity of the core. The first cladding layer 30 may be pure silica. The low-index ring 40 may be made of glass doped with an index decreasing dopant such as, but not limited to, fluorine or boron.

According to embodiments of the present disclosure, the subgroups of the $LP_{11}$ mode of the few mode optical fiber 10 having an elliptical core 20 have larger effective index differences than the subgroups of a few mode optical fiber having a circular core. The subgroups of the $LP_{11}$ mode may have a $\Delta n_{eff}$ of greater than about $2.8 \times 10^{-6}$. For example, the subgroups of the $LP_{11}$ mode may have a $\Delta n_{eff}$ of greater than about $3.0 \times 10^{-5}$ or even greater than about $1.0 \times 10^{-4}$. The larger effective index differences of the mode subgroups results in a reduction of the coupling of the degrees of freedom within the mode.

According to embodiments of the present disclosure, the at least one coating may include a primary coating 62 contacting and surrounding the outer cladding layer 50 and a secondary coating 64 contacting and surrounding the primary coating 62. The primary coating 62 and/or the secondary coating 64, when used in conjunction with optical fibers as disclosed herein, help achieve lower mode coupling resulting in multi-pass interference (MPI) of less than about −30 dB at a wavelength of 1550 nm. The primary coating 62 may have an in situ modulus of less than about 0.35 MPa. For example, the primary coating 62 may have an in-situ modulus of less than about 0.30 MPa, or even less than about 0.20 MPa. The in-situ modulus may be between about 0.05 MPa and about 0.2 MPa. The primary coating 62 also has an in situ glass transition temperature $T_g$ that is lower than the lowest projected use temperature of the coated optical fiber. The primary coating 62 may have an in situ glass transition temperature of less than about −35° C. For example, the primary coating 62 may have an in situ glass transition temperature of less than about −40° C., or even less than about −50° C. The $T_g$ may be between about −35° C. and about −100° C. A primary coating with a low in situ modulus reduces the microbending which is the coupling mechanism between the modes propagating in the fiber. A low in situ $T_g$ ensures that the in situ modulus of the primary coating will remain low even when the fiber is deployed in very cold environments. The microbending performance will therefore be stable with temperature, and this stability results in low mode coupling in all situations and thus better MPI.

The primary coating 62 is formed from a soft cross-linked polymer material having a low in situ modulus, such as less than about 0.35 MPa, and a low in situ $T_g$, such as less than about −35° C. Exemplary primary coating compositions are disclosed, for example in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. Nos. 7,010,206 and 7,221,842 to Baker et al., and U.S. Pat. No. 7,423,105 to Winningham, each of which are incorporated in their entirety herein by reference. The composition of the primary coating 62 may be applied to the optical fiber 10 as a liquid and cured.

The primary coating 62 has a higher refractive index than the outer cladding layer 50 of the optical fiber 10. For example, the optical fiber 10 may have refractive index values at a wavelength of 1550 nm of about 1.447 for the core 20 and about 1.436 for the cladding. As such, the refractive index of primary coating 62 at a wavelength of 1550 nm may be greater than about 1.44. The primary coating 62 is configured to maintain adequate adhesion to the glass fiber 10 during thermal and hydrolytic aging, but may also be strippable therefrom for splicing purposes. The primary coating 62 may have a thickness of between about 20 μm and about 50 μm. For example, the primary coating 62 may have a thickness of between about 25 μm and about 33 μm.

According to embodiments of the present disclosure, the secondary coating 64 has an in situ modulus of greater than about 1200 MPa. For example, the secondary coating 64 may have an in situ modulus of greater than about 1300 MPA. A secondary coating with a high in situ modulus also reduces microbending. The material of the secondary coating 64 may be, for example, the polymerization product of a coating composition which includes molecules that become highly cross-linked when polymerized. The secondary coating 64 also has an in-situ $T_g$ of greater than about 50° C. For example, the in situ $T_g$ of the secondary coating 64 may be between about 50° C. and about 120° C., or even between about 50° C. and about 100° C. The secondary coating 64 has a thickness that is less than about 40 μm, such as between about 20 μm and about 40 μm, or even between about 20 μm and about 30 μm.

Figure 3:
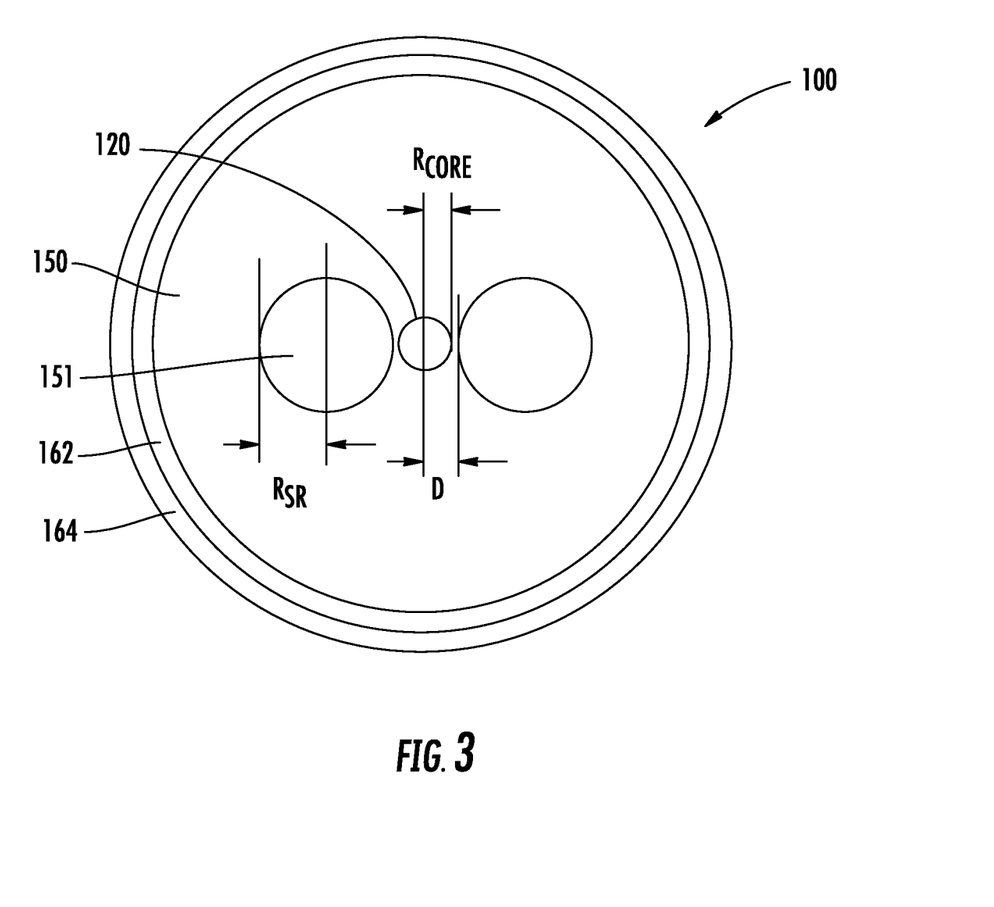
FIG. 3 illustrates a cross section of an optical fiber in accordance with embodiments of the present disclosure.

FIG. 3 illustrates a cross-section of a few mode optical fiber 100 in accordance with another embodiment of the present disclosure. As shown, the optical fiber 100 includes a silica based core 120 extending along the longitudinal axis of the fiber. Generally, the core 120 may have the same characteristics as the core 20 of the optical fiber 10 illustrated in FIG. 1. However, the core 120 may be either elliptical or, as shown in FIG. 3, circular. The core 120 is surrounded by a cladding layer 150 which includes and/or surrounds at least one stress member 151. The optical fiber 100 may also include at least one coating having a primary coating 162 contacting and surrounding the cladding layer 150 and a secondary coating 164 contacting and surrounding the primary coating 162. The primary coating 162 and the secondary coating 164 may have the same characteristics as primary coating 62 and secondary coating 64 of the optical fiber 10 illustrated in FIG. 1.

The at least one stress member 151 is adjacent to, or in contact with, the core 120. The at least one stress member 151 may include a dopant that increases the thermal expansion coefficient (CTE) of the at least one stress member 151 and to produce thermal stress. The CTE increasing dopant may be, but is not limited to, $B_2O_3$. The CTE increasing dopant concentration may be greater than about 5.0 wt. %. For example, the dopant concentration may be greater than about 10 wt. %, or even greater than about 15 wt. %. Alternatively, the at least one stress member 151 may include a dopant that decreases the viscosity of the at least one stress member 151 to produce mechanical stress caused by draw tension. The viscosity decreasing dopant may be, but is not limited to, fluorine. The viscosity decreasing dopant concentration may be greater than about 1.0 wt. %. For example, the viscosity decreasing dopant concentration may be between about 1.0 wt. % and about 4.0 wt. %. The at least one stress member 151 may also be co-doped with $B_2O_3$ and fluorine.

As shown in the exemplary embodiment of FIG. 3, the at least one stress member 151 may include at least two stress rods positioned on diametrically opposite sides of the core 120. The at least two stress rods may be situated such that they touch the core 120. Alternatively, the rods may be situated in close proximity to the core 120, such as within 10 microns of the core 120. For example, an edge of the at least two stress rods may be located between about 0.1 microns and about 5.0 microns from an edge of the core 120. The radius $R_{SR}$ of the at least two stress rods may be greater than the edge-to-edge distance (D-$R_{CORE}$) between the core 120 and the at least two stress rods. For example, as shown in FIG. 3, $R_{SR}$>D-$R_{CORE}$. Additionally, the edge-to-edge distance (D-$R_{CORE}$) is less than the diameter of the core 120. In other terms, 2 $R_{CORE}$>D-$R_{CORE}$.

The cross-section of the at least two stress rods may be circular, but may optionally be of other shapes. The at least two stress rods may be of equal or non-equal size. The at least two stress rods may have a radius $R_{SR}$ of between about 2.5 μm and about 20 μm. For example, the at least two stress rods may have a radius $R_{SR}$ of between about 5.0 μm and about 15 μm, or between about 10 μm and about 25 μm, or even between about 10 μm and about 20 μm. Although FIG. 3 shows only one stress rod on each side of the core 120, the optical fiber 100 may include multiple stress rods on each side of the core 120.

The at least one stress member 151 distributes asymmetric stresses through the core 120 which results in a birefringent refractive index distribution and contributes to mode maintaining properties of the optical fiber 100 and decreases mode coupling. The birefringence of the core 120 is greater than about $5.0 \times 10^{-5}$ over the wavelength range from about 800 nm to about 1700 nm. For example, the birefringence of the core 120 may be greater than about $1.0 \times 10^{-4}$ over the wavelength range from about 800 nm to about 1700 nm.

Few mode optical fiber having an elliptical core in accordance with embodiments of the present disclosure have increased effective index differences between the modes in each mode subgroup as compared to few mode optical fiber having a circular core. Few mode optical fiber having stress rods in accordance with embodiments of the present disclosure similarly have increased effective index differences between the modes in each mode subgroup as compared to few mode optical fiber having no stress rods. The increased effective index differences result in decreased mode coupling. Such a decrease in mode coupling reduces distortion issues conventionally associated with few mode fiber.

EXAMPLES

Embodiments of the present disclosure are further described below with respect to certain exemplary and specific embodiments thereof, which are illustrative only and not intended to be limiting.

Example 1

Various embodiments of the foregoing fibers will be further clarified by the following examples of modeled fibers. It will be apparent to those skilled in the art that various modifications and variations can be made without departing from the spirit or scope of the present disclosure. Examples of modeled few mode optical fibers and properties are shown below in Tables I-III, consistent with one or more of the few mode fibers described in the foregoing aspects of the disclosure.

Set forth in Tables I-III below are the following parameters and fiber dimensions for various few mode fibers: $\Delta_{1\ MAX}$ (%) of the core, $\Delta_{2\ MIN}$ (%) of the low-index ring, core alpha, core ovality, radius $R_1$ of the core in a first dimension (μm), radius $R_2$ of the first cladding layer in the first dimension (μm), radius $R_3$ of the low-index ring in the first dimension (μm), radius $R_4$ of the outer cladding layer in the first dimension (μm), average radius $R_0$ of the core (μm), and $\Delta n_{eff,11}$, the average effective index difference between the two sub-groups in $LP_{11}$. Additionally, the few mode fibers in Table III include two stress rods positioned on opposite sides of the core and the following additional parameters and fiber dimensions are included: distance (D) between the center of the core and the edge of the stress rod (μm); $B_2O_3$ In Stress Rod (wt %); and Fluorine In Stress Rod (wt %).

TABLE I

|  | Model 1 | Model 2 | Model 3 | Model 4 | Model 5 | Model 6 | Model 7 | Model 8 |
|---|---|---|---|---|---|---|---|---|
| $\Delta_{1MAX}$ (%) | 0.45 | 0.45 | 0.45 | 0.45 | 0.45 | 0.45 | 0.45 | 0.45 |
| $\Delta_{2MIN}$ (%) | −0.45 | −0.45 | −0.45 | −0.45 | −0.45 | −0.45 | −0.45 | −0.45 |
| $R_1$ (μm) | 12 | 11.91 | 11.56 | 11.15 | 10.76 | 10.39 | 9.70 | 9.07 |
| $R_2$ (μm) | 13.5 | 13.30 | 12.91 | 12.45 | 12.02 | 11.60 | 10.84 | 10.13 |
| $R_3$ (μm) | 18.5 | 18.26 | 17.73 | 17.1 | 16.50 | 15.94 | 14.88 | 13.91 |
| $R_4$ (μm) | 62.5 | 62.5 | 62.5 | 62.5 | 62.5 | 62.5 | 62.5 | 62.5 |
| $R_0$ (μm) | 12.0 | 12.0 | 12.0 | 12.0 | 12.0 | 12.0 | 12.0 | 12.0 |
| χ | 0 | 0.01 | 0.05 | 0.10 | 0.15 | 0.20 | 0.30 | 0.40 |
| α | 1.93 | 1.93 | 1.93 | 1.93 | 1.93 | 1.93 | 1.93 | 1.93 |
| $\Delta n_{\mathit{eff},11}$ | $2.8 \times 10^{-6}$ | $3.0 \times 10^{-5}$ | $1.5 \times 10^{-4}$ | $3.0 \times 10^{-4}$ | $4.5 \times 10^{-4}$ | $6.0 \times 10^{-4}$ | $9.1 \times 10^{-4}$ | $2.6 \times 10^{-3}$ |

Table I shows that $\Delta n_{\mathit{eff},11}$, the average effective index difference between the two sub-groups in $LP_{11}$, increases as ovality of the core increases. As discussed above, the increased effective index differences are related to a reduction of coupling of the sub-groups within the mode. Therefore, coupling of the sub-groups within the mode decreases as ovality of the core increases.

TABLE II

|  | Model 9 | Model 10 | Model 11 | Model 12 | Model 13 | Model 14 | Model 15 |
|---|---|---|---|---|---|---|---|
| $\Delta_{1MAX}$ (%) | 0.5 | 0.6 | 0.3 | 0.35 | 0.3 | 0.25 | 0.45 |
| $\Delta_{2MIN}$ (%) | −0.45 | −0.45 | −0.45 | −0.45 | −0.45 | −0.45 | 0 |
| $R_1$ (μm) | 9.29 | 9.29 | 18.59 | 18.59 | 27.88 | 37.17 | 11.91 |
| $R_2$ (μm) | 10.60 | 10.60 | 19.89 | 19.89 | 29.18 | 38.47 | N/A |
| $R_3$ (μm) | 15.24 | 15.24 | 24.53 | 24.53 | 33.83 | 43.12 | N/A |
| $R_4$ (μm) | 62.5 | 62.5 | 62.5 | 62.5 | 62.5 | 62.5 | 62.5 |
| $R_0$ (μm) | 10.0 | 10.0 | 20.0 | 20.0 | 30.0 | 40.0 | 12.0 |
| χ | 0.10 | 0.10 | 0.10 | 0.10 | 0.10 | 0.10 | 0.10 |
| α | 1.93 | 1.93 | 1.93 | 1.93 | 1.93 | 1.93 | 1.93 |
| $\Delta n_{\mathit{eff},11}$ | $3.5 \times 10^{-4}$ | $4.1 \times 10^{-4}$ | $1.5 \times 10^{-4}$ | $1.6 \times 10^{-4}$ | $1.0 \times 10^{-4}$ | $6.7 \times 10^{-5}$ | $2.9 \times 10^{-4}$ |

Table II shows that $\Delta n_{\mathit{eff},11}$, the average effective index difference between the two sub-groups in $LP_{11}$, increases as $\Delta_{1\ MAX}$ of the core increases in a fiber with an elliptical core. Therefore, coupling of the sub-groups within the mode decreases as $\Delta_{1\ MAX}$ of an elliptical core increases. Model 15 shows an embodiment of a few mode optical fiber having $\Delta_{2\ MIN}=0$ relative to the outer cladding layer. In such a few mode optical fiber, the outer cladding layer and the low-index ring have the same delta, and may be said to have no low-index ring. As shown in Table II, a few mode optical fiber having an elliptical core and no low-index ring also have increased $\Delta n_{\mathit{eff},11}$ as compared to few mode optical fiber having a circular core.

TABLE III

|  | Model 16 | Model 17 | Model 18 |
|---|---|---|---|
| $\Delta_{1MAX}$ (%) | 0.45 | 0.45 | 0.45 |
| $\Delta_{2MIN}$ (%) | −0.45 | 0 | 0 |
| $R_1$ (μm) | 12.0 | 12.0 | 12.0 |
| $R_2$ (μm) | 13.5 | N/A | N/A |
| $R_3$ (μm) | 18.5 | N/A | N/A |
| $R_4$ (μm) | 62.5 | 62.5 | 62.5 |
| $R_0$ (μm) | 12.0 | 12.0 | 12.0 |
| χ | 0 | 0 | 0 |
| α | 1.93 | 1.93 | 1.93 |
| D (μm) | 20.0 | 15.0 | 15.0 |
| $B_2O_3$ In Stress Rod (wt %) | 18.4 | 18.4 | 0 |
| Fluorine In Stress Rod (wt %) | 0 | 0 | 3.0 |
| $\Delta n_{\mathit{eff},11}$ | $2.0 \times 10^{-4}$ | $3.2 \times 10^{-4}$ | $1.5 \times 10^{-4}$ |

Table III shows that the presence of stress rods in a few mode optical fiber also influences increased $\Delta n_{\mathit{eff},11}$ in fiber having a circular core. As shown by Models 17 and 18, the same is true for few mode optical fiber having stress rods and no low-index ring.

Example 2

A few mode optical fiber having an elliptical core in accordance with embodiments of the present disclosure was formed using a soot drilling method. A silica soot blank having a mass of 5,000 grams was prepared using an outside vapor deposition (OVD) process. The silica soot blank included a central hole having a diameter of 9.0 mm. The blank had an outer diameter of 122 mm and a post laydown soot density of 0.541 g/cm³. A section of the soot blank having a length of 30 cm was cut and pre-sintered at a temperature of 1270° C. for 3.0 hours in a helium atmosphere to increase the density of the silica soot blank to about 1.0 g/cm³. The silica soot blank was pre-sintered to provide adequate mechanical strength for drilling holes in the soot blank. After pre-sintering, two holes having diameters of 18 mm were drilled on opposite sides of the central hole. A glass core cane having an outer diameter of 8.5 mm was inserted into the central hole. The glass core cane included germanium and had a graded profile with a peak delta of 0.5% and an alpha of about 2. Two fluorine doped glass rods having outer diameters of 18 mm were inserted into the two holes that were drilled into the silica soot blank. The rods had a fluorine concentration of about 2.69 mol. % and a delta of −0.45%. The silica soot blank with the core cane and the two rods was sintered in a furnace to form a glass preform. The preform was drawn into fibers having diameters of 125 μm and 100 μm using a draw tension of about 200 grams. As a result of the draw tension, the fiber was formed with an elliptical core. In addition, the rods in the fibers as formed were observed to be deformed (not circular) as a result of the asymmetric stresses distributed by the rods.

It will be apparent to those skilled in the art that various modifications and variations can be made without departing from the spirit or scope of the claims.

What is claimed is:

1. A few-mode optical fiber comprising:
an elliptical core having a maximum relative refractive index of $\Delta_{1\ MAX}$, the elliptical core being capable of supporting the propagation and transmission of an optical signal with X number of LP modes, wherein X is an integer greater than 1 and less than 20; and
a cladding surrounding the core, the cladding comprising:
a low-index ring having a radius in a first dimension and a radius in a second dimension perpendicular to the first dimension and having a minimum relative refractive index of $\Delta_{2\ MIN}$;
a first cladding layer having a relative refractive index of $\Delta_3$, the low-index ring being spaced from the core by the first cladding layer; and
an outer cladding layer surrounding the low-index ring, wherein the core has an ovality of greater than about 5.0%,
wherein the low-index ring radius in the first dimension is greater than the low-index ring radius in the second dimension, and
wherein $\Delta_{1\ MAX} > \Delta_3 > \Delta_{2\ MIN}$.

2. The few-mode optical fiber of claim 1, wherein the core has an ovality of greater than about 8.0%.

3. The few-mode optical fiber of claim 1, wherein the difference between effective area of subgroups of LP modes is greater than about $2.8 \times 10^{-6}$.

4. The few-mode optical fiber of claim 1, wherein the difference between effective area of subgroups of LP modes is greater than about $3.0 \times 10^{-5}$.

5. The few-mode optical fiber of claim 1, wherein the core comprises germania-doped silica.

6. The few-mode optical fiber of claim 1, wherein the core comprises an average core radius of between about 6.0 μm and about 40 μm.

7. The few-mode optical fiber of claim 1, wherein the relative refractive index difference of $\Delta_{1\ MAX}$ with respect to pure silica is between about 0.3% and about 1.0%.

8. The few-mode optical fiber of claim 7, wherein the relative refractive index difference of $\Delta_{1\ MAX}$ with respect to pure silica is between about 0.4% and about 0.6%.

9. The few-mode optical fiber of claim 1, wherein the relative refractive index difference of $\Delta_{2\ MIN}$ with respect to pure silica is less than or equal to about 0%.

10. The few-mode optical fiber of claim 1, wherein the relative refractive index difference of $\Delta_{2\ MIN}$ with respect to pure silica is less than or equal to about −0.2%.

11. The few-mode optical fiber of claim 1, further comprising a primary coating surrounding the cladding.

12. The few-mode optical fiber of claim 11, further comprising a secondary coating surrounding the primary coating.

13. The few-mode optical fiber of claim 1 comprising a birefringence of greater than about $5.0 \times 10^{-5}$ over the wavelength range from about 800 nm to about 1700 nm.

* * * * *